(12) United States Patent
Churi et al.

(10) Patent No.: US 8,521,729 B2
(45) Date of Patent: *Aug. 27, 2013

(54) METHODS, SYSTEMS, AND COMPUTER PROGRAM PRODUCTS FOR GENERATING DATA QUALITY INDICATORS FOR RELATIONSHIPS IN A DATABASE

(75) Inventors: Prashant Sharad Churi, Scottsdale, AZ (US); German Gonzalo Creamer, Jersey City, NJ (US); Sara Tresch, New York, NY (US); Mary Weissman, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/251,933

(22) Filed: Oct. 3, 2011

(65) Prior Publication Data
US 2012/0030216 A1 Feb. 2, 2012

Related U.S. Application Data

(63) Continuation of application No. 11/867,640, filed on Oct. 4, 2007, now Pat. No. 8,060,502.

(51) Int. Cl.
*G06F 7/00* (2006.01)
(52) U.S. Cl.
USPC ............................ 707/726; 707/763; 705/741
(58) Field of Classification Search
USPC ................. 707/723, 726, 736, 747, 748, 749, 707/763, 949; 705/1.1, 7.11, 7.29, 7.41
See application file for complete search history.

(56) References Cited

U.S. PATENT DOCUMENTS

| | | | |
|---|---|---|---|
| 5,659,731 A * | 8/1997 | Gustafson | ............................ 1/1 |
| 5,920,629 A | 7/1999 | Rosen | |
| 5,966,695 A | 10/1999 | Melchione et al. | |
| 5,995,946 A | 11/1999 | Auzenne et al. | |
| 6,185,569 B1 | 2/2001 | East et al. | |
| 6,523,019 B1 | 2/2003 | Borthwhick | |
| 6,985,879 B2 | 1/2006 | Walker et al. | |
| 7,043,476 B2 | 5/2006 | Robson | |
| 7,069,264 B2 | 6/2006 | Anjur et al. | |
| 7,376,680 B1 | 5/2008 | Kettler et al. | |
| 7,490,059 B2 | 2/2009 | Albee et al. | |
| 7,562,067 B2 | 7/2009 | Chaudhuri et al. | |

(Continued)

OTHER PUBLICATIONS

USPTO; Final Office Action dated Mar. 16, 2012 in U.S. Appl. No. 11/529,604.

(Continued)

*Primary Examiner* — Greta Robinson
(74) *Attorney, Agent, or Firm* — Snell & Wilmer L.L.P.

(57) ABSTRACT

The disclosed methods, systems, and computer-program products allow a business to generate data quality indicators for relationships in a database. In an embodiment, one or more relationships linked to a customer are retrieved from a database to form a set of relationships. A match confidence code is generated for each relationship based on a score generated by the comparison of customer data associated with the respective relationship and corresponding customer data obtained from an external industry database. A link confidence code is subsequently determined for the customer based on a score generated by the scores used to define the match confidence code for each relationship in the set of relationships and on internal data associated with each relationship in the set of relationships.

20 Claims, 6 Drawing Sheets

(56) References Cited

U.S. PATENT DOCUMENTS

| | | | |
|---|---|---|---|
| 7,725,421 | B1 | 5/2010 | Gedalius et al. |
| 7,840,571 | B2 * | 11/2010 | Forman et al. ............... 707/749 |
| 2002/0023217 | A1 | 2/2002 | Wheeler et al. |
| 2002/0059187 | A1 | 5/2002 | Delo et al. |
| 2002/0072927 | A1 | 6/2002 | Phelan et al. |
| 2003/0074343 | A1 | 4/2003 | Onuki |
| 2003/0084024 | A1 | 5/2003 | Christensen et al. |
| 2003/0191703 | A1 | 10/2003 | Chen et al. |
| 2003/0204460 | A1 | 10/2003 | Robinson et al. |
| 2004/0204958 | A1 | 10/2004 | Perkins et al. |
| 2004/0220865 | A1 | 11/2004 | Lozowski et al. |
| 2004/0220918 | A1 * | 11/2004 | Scriffignano et al. ............ 707/3 |
| 2005/0060332 | A1 * | 3/2005 | Bernstein et al. ............ 707/100 |
| 2005/0108631 | A1 * | 5/2005 | Amorin et al. ............... 715/513 |
| 2005/0147225 | A1 | 7/2005 | Mallick et al. |
| 2005/0149527 | A1 | 7/2005 | Berlin et al. |
| 2005/0154664 | A1 | 7/2005 | Guy et al. |
| 2005/0187938 | A1 | 8/2005 | Grear et al. |
| 2005/0262044 | A1 | 11/2005 | Chaudhuri et al. |
| 2006/0036543 | A1 | 2/2006 | Blagg et al. |
| 2006/0059225 | A1 | 3/2006 | Stonehocker et al. |
| 2006/0080281 | A1 | 4/2006 | Bongiorno et al. |
| 2006/0085361 | A1 | 4/2006 | Hoerle et al. |
| 2006/0179050 | A1 | 8/2006 | Giang et al. |
| 2006/0238919 | A1 | 10/2006 | Bradley |
| 2006/0271568 | A1 | 11/2006 | Balkir et al. |
| 2006/0282429 | A1 | 12/2006 | Hernandez-Sherrington et al. |
| 2007/0016616 | A1 | 1/2007 | Brill et al. |
| 2007/0100856 | A1 | 5/2007 | Ebbesen |
| 2007/0192122 | A1 | 8/2007 | Routson et al. |
| 2007/0208787 | A1 | 9/2007 | Cheng et al. |
| 2008/0154541 | A1 | 6/2008 | Gemulla et al. |
| 2008/0208735 | A1 | 8/2008 | Balet et al. |
| 2008/0222207 | A1 | 9/2008 | Ito |
| 2008/0301016 | A1 | 12/2008 | Durvasula et al. |
| 2009/0070289 | A1 | 3/2009 | Churi et al. |
| 2013/0031109 | A1 | 1/2013 | Routson et al. |

OTHER PUBLICATIONS

USPTO; Advisory Action dated May 10, 2012 in U.S. Appl. No. 11/677,906.
USPTO; Advisory Action dated May 22, 2012 in U.S. Appl. No. 11/529,604.
USPTO; Notice of Allowance dated Jul. 17, 2012 in U.S. Appl. No. 11/529,604.
USPTO; Final Office Action dated Nov. 18, 2011 in U.S. Appl. No. 11/677,906.
USPTO; Notice of Allowance dated Dec. 21, 2011 in U.S. Appl. No. 11/854,259.
USPTO; Office Action dated Dec. 7, 2011 in U.S. Appl. No. 11/529,604.
USPTO; Preinterview First Office Action dated Oct. 2, 2008 in U.S. Appl. No. 11/529,604.
USPTO; Office Action dated Nov. 21, 2008 in U.S. Appl. No. 11/529,604.
USPTO; Office Action dated Mar. 23, 2009 in U.S. Appl. No. 11/529,604.
USPTO; Final Office Action dated Oct. 13, 2009 in U.S. Appl. No. 11/529,604.
USPTO; Advisory Action dared Jan. 26, 2010 in U.S. Appl. No. 11/529,604.
USPTO; Office Action dated Mar. 8, 2011 in U.S. Appl. No. 11/529,604.
USPTO; Final Office Action dated Aug. 17, 2011 in U.S. Appl. No. 11/529,604.
USPTO; Advisory Action dared Oct. 24, 2011 in U.S. Appl. No. 11/529,604.
USPTO; Office Action dated Dec. 11, 2008 in U.S. Appl. No. 11/677,906.
USPTO; Office Action dated Jun. 11, 2009 in U.S. Appl. No. 11/677,906.
USPTO; Final Office Action dated Jan. 7, 2010 in U.S. Appl. No. 11/677,906.
USPTO; Advisory Action dated Mar. 5, 2010 in U.S. Appl. No. 11/677,906.
USPTO; Office Action dated Apr. 1, 2010 in U.S. Appl. No. 11/677,906.
USPTO; Final Office Action dated Aug. 26, 2010 in U.S. Appl. No. 11/677,906.
USPTO; Advisory Action dated Nov. 12, 2010 in U.S. Appl. No. 11/677,906.
USPTO; Office Action dated Jun. 9, 2011 in U.S. Appl. No. 11/677,906.
USPTO; Office Action dated Jul. 8, 2009 in U.S. Appl. No. 11/755,313.
USPTO; Final Office Action dated Jan. 8, 2010 in U.S. Appl. No. 11/755,313.
USPTO; Advisory Action dated Mar. 1, 2010 in U.S. Appl. No. 11/755,313.
USPTO; Office Action dated Oct. 6, 2009 in U.S. Appl. No. 11/854,259.
USPTO; Office Action dated Mar. 10, 2010 in U.S. Appl. No. 11/854,259.
USPTO; Final Office Action dated Aug. 19, 2010 in U.S. Appl. No. 11/854,259.
USPTO; Advisory Action dated Oct. 20, 2010 in U.S. Appl. No. 11/854,259.
USPTO; Office Action dated Dec. 27, 2010 in U.S. Appl. No. 11/854,259.
USPTO; Final Office Action dated May 27, 2011 in U.S. Appl. No. 11/854,259.
USPTO; Advisory Action dated Jul. 28, 2011 in U.S. Appl. No. 11/854,259.
USPTO; Office Action dated Oct. 11, 2011 in U.S. Appl. No. 11/854,259.
PCT; International Search Report and Written Opinion dated May 28, 2008 in Application No. PCT/US2008/06711.
PCT; International Preliminary Report on Patentability dated Dec. 1, 2009 in Application No. PCT/US2008/06711.
USPTO; Office Action dated Mar. 1, 2013 in U.S. Appl. No. 11/755,313.

* cited by examiner

METHODS, SYSTEMS, AND COMPUTER PROGRAM PRODUCTS FOR GENERATING DATA QUALITY INDICATORS FOR RELATIONSHIPS IN A DATABASE

CROSS REFERENCE TO RELATED APPLICATION

This invention is a continuation of, and claims priority to, U.S. Ser. No. 11/867,640 filed on Oct. 4, 2007 and entitled "Methods, Systems, and Computer Program Products for Generating Data Quality Indicators for Relationships in a Database," which is incorporated herein by reference.

BACKGROUND

1. Field of the Invention

This invention generally relates to managing information in a database, and in particular, it relates to methods for generating indicators of data quality in databases.

2. Related Art

Customers often have more than one account established through a business, especially with a service-oriented business such as a financial services company or an insurance business. In the case of the financial services industry, for example, a single customer may have any combination of a personal bank account, a mortgage, a line of credit (such as a home equity line of credit), a personal credit card, a business credit card, a rewards account, and one or more investment accounts with a single financial institution. In the insurance business, a single customer may have any combination of health insurance, auto insurance, home owners insurance, and other kinds of insurance protection as well. Even with non-service businesses, a single customer may have multiple accounts. For example, a single customer may have one account with a computer supply company for home purchases and another account with the same company for small business purchases.

It is important for a company to recognize that all of the customer's accounts belong to a single customer and to link those accounts, in order to appropriately market to the customer without overloading the customer. Further, ensuring that all accounts for a given customer are, in fact, accurately associated with that customer is vital for businesses that offer risk management and decision-support to their customers. The correct linking of accounts with a customer can improve the accuracy of the financial company's estimate of the financial status of the customer.

In practice, accurately linking accounts with a single customer proves to be a non-trivial undertaking. It is possible to associate one or more accounts with a single customer based on unique customer identifying information, such as the customer name, social security number, date of birth, address, and other distinctive or unique identifiers. However, the association process is fallible, as it is possible that variations may creep into the way a customer's name or address is recorded, or simply that errors are made during the process of collecting customer identifying data. People change addresses over time, or change their name, which can thwart efforts to make account associations based on the name, address, or other time-variant identification data.

Still another factor which makes it difficult to effectively recognize which accounts are, in fact, associated with a single customer is the size of many businesses. A large service business, such as a large financial institution, may have multiple business units. Often, these business units do not efficiently or effectively share information, since in some cases data processing may be distributed over multiple computer systems and software systems. As a result customer information can be fragmented over these multiple data processing systems and their associated databases.

The difficulties inherent to the linking process often result in errors in the linking process. For example, it is possible that that accounts which actually belong to two separate customers may become associated, within the business database, with a single customer and thus be incorrectly linked. Further, it may also be possible that two accounts belonging to a single customer may not be associated with that customer in the business database.

Therefore, it is essential to businesses, such as the financial services industries, to recognize the quality of data associated with linked accounts and to address the underlying factors that contribute to this data quality. However, existing techniques are generally capable of indicating only whether an account is linked to another account or linked to a customer. These techniques are generally unable to provide any detailed accounting of the quality of the data associated with the accounts or the quality of linking between these accounts.

SUMMARY OF THE INVENTION

Accordingly, the present disclosure introduces methods, systems, and computer-program products for generating data quality indicators for relationships in a database.

According to various embodiments of the disclosed processes, one or more relationships linked to a customer are retrieved from a database to form a set of relationships. A match confidence code is generated for each relationship in the set of relationships by comparing customer data associated with the respective relationship to corresponding customer data obtained from an industry database. A link confidence code is subsequently determined for the customer based on internal data associated with the relationship and the generated match confidence code for each relationship in the set of relationships. At least one of the link confidence codes associated with the customer and the match confidence code associated with each relationship linked to the customer are provided to an end user of the relationship.

Further features and advantages of the present invention as well as the structure and operation of various embodiments of the present invention are described in detail below with reference to the accompanying drawings.

BRIEF DESCRIPTION OF THE DRAWINGS

The features of the present invention will become more apparent from the detailed description set forth below when taken in conjunction with the drawings. The left-most digit of a reference number identifies the drawing in which the reference number first appears.

DETAILED DESCRIPTION

Figure 1:
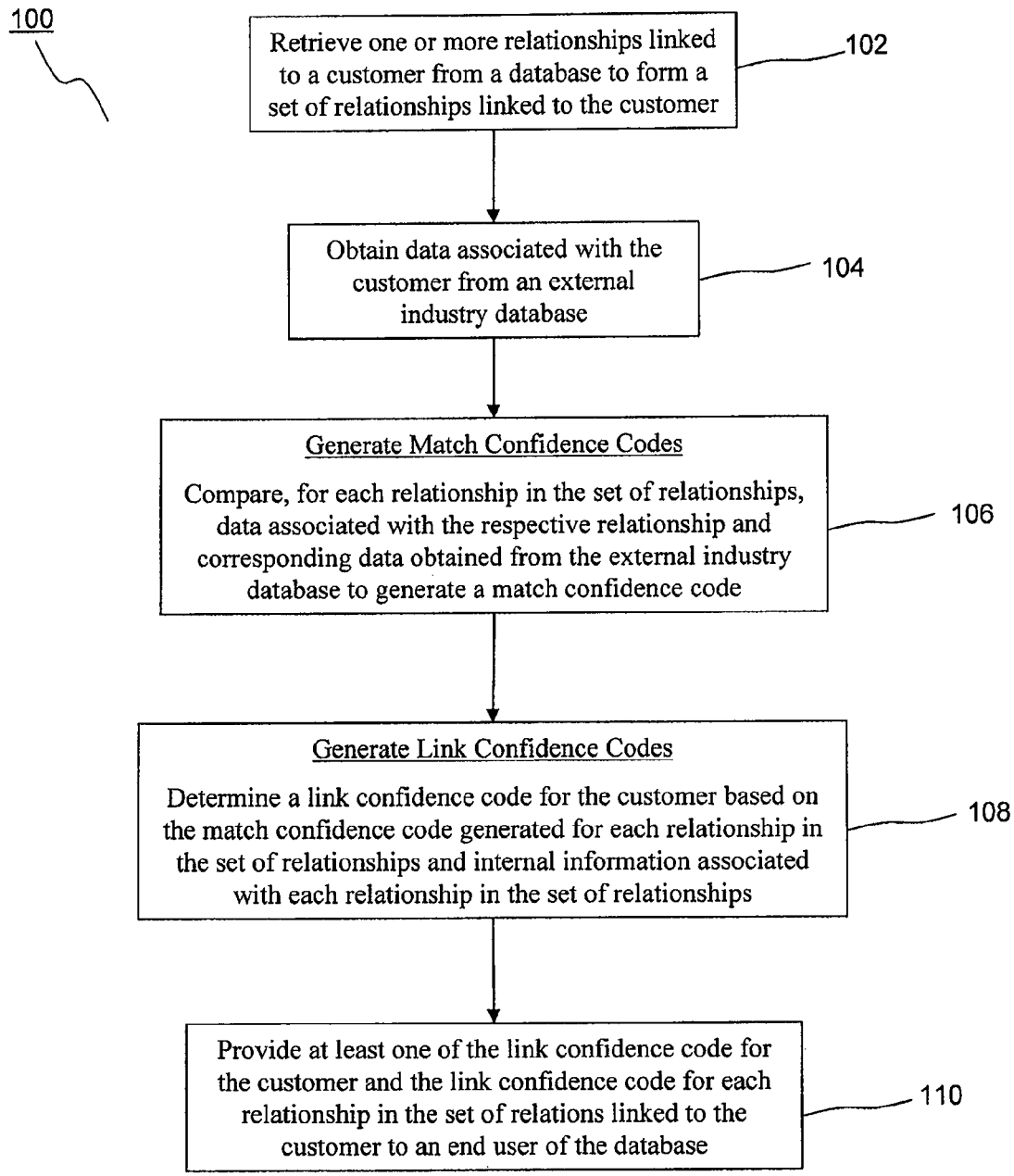
FIG. 1 illustrates an exemplary method for estimating the accuracy of relationships linked to customers in a database.

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

I. Terminology

The terms "user", "end user", "consumer", "customer", "participant", and/or the plural form of these terms are used interchangeably throughout herein to refer to those persons or entities capable of accessing, using, being affected by and/or benefiting from the tool described herein.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "customer relationship," as used herein, refers to a relationship established between a customer and a business. In one example, a customer relationship may be an account established between a customer and a service oriented business, such as a financial services company or a consumer travel agency. In the case of the financial services industry, for example, a single customer may have any combination of a personal bank account, a mortgage, a line of credit (such as a home equity line of credit), a personal credit card, a business credit card, a rewards account, and one or more investment accounts with a single financial institution.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument. The terms "account provider" or "financial institution" as used herein refer to the financial institution associated with the account.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Persons skilled in the relevant arts will understand the breadth of the terms used herein and that the exemplary descriptions provided are not intended to be limiting of the generally understood meanings attributed to the foregoing terms.

II. Overview

The processes now introduced allow a business, such as a service-oriented business or a financial services company, to generate data quality indicators for relationships linked to customers and to improve the quality of customer-level decision making based on these indicators. In embodiments of such processes, one or more relationships linked to a customer are retrieved from a database to form a set of relationships. A match confidence code is generated for each relationship in the set of relationships based on a comparison of customer data associated with the respective relationship and corresponding customer data obtained from an external industry database. A link confidence code is subsequently determined for the customer based on the generated match confidence code for each relationship in the set of relationships and internal data associated with each relationship in the set of relationships. At least one of the link confidence code for the customer and the match confidence codes for the set of relationships linked to the customer are subsequently provided to an end user of the database.

III. Methods, Systems, and Computer-Program Products for Estimating Accuracy of Linking of Customer Relationships FIG. 1 is an overview of an exemplary method 100 for generating data quality indicators for relationships linked to customers in a database. In one embodiment, the database may be associated with a business, and the database may include a plurality of customer relationships established between the business and a corresponding plurality of customers. For example, the customer relationship may be associated with a financial transaction instrument held by a customer and provided by a financial services company, such as American Express Company, Inc., of New York, N.Y. In addition, the customer relationship may describe a relationship between a customer and a service-oriented company, such as a consumer travel agency or insurance company.

One or more relationships associated with a particular customer are retrieved from a database in step 102 to form a set of relationships linked to the customer. As described above, these relationships may represent financial transaction instruments held by the customer, or alternatively, these customer relationships may describe relationships between the customer and a service-oriented company. In one embodiment, each retrieved relationship includes a single data record that describes elements of customer data associated with the relationship. Such data elements may include, but are not limited to, a reference number associated with the retrieved relationship, as well as a name, address, date of birth, and social security number of the customer associated with the retrieved relationship.

In step 104, information currently associated with the customer is obtained from an external industry database. In one embodiment, the external industry database may be provided by a marketing data provider, such as Experian of Costa Mesa, Calif. The information may include a number of discrete data elements, including, but not limited to, a name of the customer, an address of the customer, a date of birth of the customer, and a social security number of the customer. In addition, an authentication code associated with the customer may be obtained from the external industry database. In one embodiment, the authentication code indicates whether the customer is present in any of a number of public records, including, but not limited to, genealogical records, databases of criminal offenders, and databases of professional licensees.

In step 106, customer data associated with the relationship and corresponding customer data obtained from the external industry database are processed to generate a match confidence code for each relationship in the set of relationships. The match confidence code indicates the quality of the match between the customer data associated with the relationship and the customer data obtained from the external industry database.

In one embodiment, the match confidence code for a relationship in the set of relationships is based on a comparison of customer data associated with the relationship and corresponding customer data obtained from the external data provider. For example, a name, an address, a date of birth, and a social security number of a customer linked to the respective relationship may be compared with a corresponding customer name, address, date of birth, and social security number obtained from the external industry database. The comparison may result in a set of match scores for the relationship that individually and collectively indicate the quality of the match between the respective elements of customer data.

In additional embodiments, the authentication code associated with the customer, and obtained from the external industry database, may be appended to the set of match scores for the relationship. In such a case, the match confidence code generated for each relationship may describe both the authentication of the customer and the quality of the match between customer data associated with the relationship and customer data obtained from the external industry database.

In step 106, the match confidence code for each relationship in the set of relationships may be selected from one of a plurality of confidence levels depending on the authentication code obtained from the external industry database and the set of match scores for each relationship in the set of relationships. The plurality of confidence levels may include, but are not limited to, confidence levels of LOW, MAYBE, WEAK YES, STRONG YES, and EXACT. Further, in an additional embodiment, a higher confidence level may be assigned to a relationship linked to an authenticated customer than would be assigned to a comparable relationship linked to an unauthenticated customer. One skilled in the art would recognize that additional confidence levels, including numerical values, might be assigned to relationships without departing from the spirit and scope of the present invention.

The match confidence codes for the relationships in the set of relationships linked with the customer are then processed in step 108 to generate a link confidence code for the customer. In contrast to the match confidence code, the link confidence code is generated at the customer level, and the link confidence code indicates the quality of the linking between the customer and the set of relationships. As such, the link confidence code may serve as a metric for identifying those customers that are linked incorrectly to one or more relationships.

In step 108, the link confidence code of the customer may be determined from the match confidence code generated for each relationship in the set of relationships and the internal information associated with each relationship in the set of relationships. In one embodiment, the internal information may include data that indicates an age of the customer information associated with the relationship, including, but not limited to, the time period since the customer information was updated (e.g., thirty days, one hundred days, one year, etc.). In additional embodiments, the internal information may indicate an age of customer data entered onto a customer service website associated with the relationship (e.g., a customer service website for a financial transaction instrument). One skilled in the art would recognize that additional sources and varieties of internal information may be used to generate the link confidence score for the customer without departing from the spirit and scope of the present invention.

The link confidence code for the customer may be selected in step 108 from one of a plurality of confidence levels depending on the match confidence codes for the set of relationships and the internal data. The plurality of confidence levels may include, but are not limited to, confidence levels of LOW, MAYBE, WEAK YES, STRONG YES, and EXACT. Further, in additional embodiments, the internal information associated with the customer may be weighted such that a higher confidence level may be generated for a relationship having more recently updated customer information than would be generated for a relationship having less frequently updated customer information. One skilled in the art would recognize that additional confidence levels, including numerical values, might be assigned to relationships without departing from the spirit and scope of the present invention.

In step 110, at least one of the link confidence codes for the customer and the match confidence code for each relationship in the set of relationships linked to the customer is provided to an end user of the database. In one embodiment, the end user of the database analyzes the link confidence code and match confidence codes in an effort to improve the quality of decisions made at the customer level.

For example, a business, such as a financial services company, may use the link confidence code to make decisions on customer exposure and risk. In such an embodiment, the financial services company may be willing to assume little additional risk or exposure for a customer assigned a low-level link confidence code (e.g., LOW or MAYBE), thereby causing potential point-of-sale (POS) disruptions for the customer. By segmenting certain classes of customers of the financial services company (such as high value (HV) customers), the financial services company could target its efforts to increase the match and link confidence codes of segments of customers in an effort to reduce POS disruption and improve brand experience.

Further, in additional embodiments, the link confidence code for the customer and the match confidence code for each relationship in the set of the relationships may be analyzed in an effort to improve the quality of data and linkages in the database. Additionally, the link and match confidence codes may indicate actionable items that improve the data collection and data input processes for relationships in the database.

Figure 2:
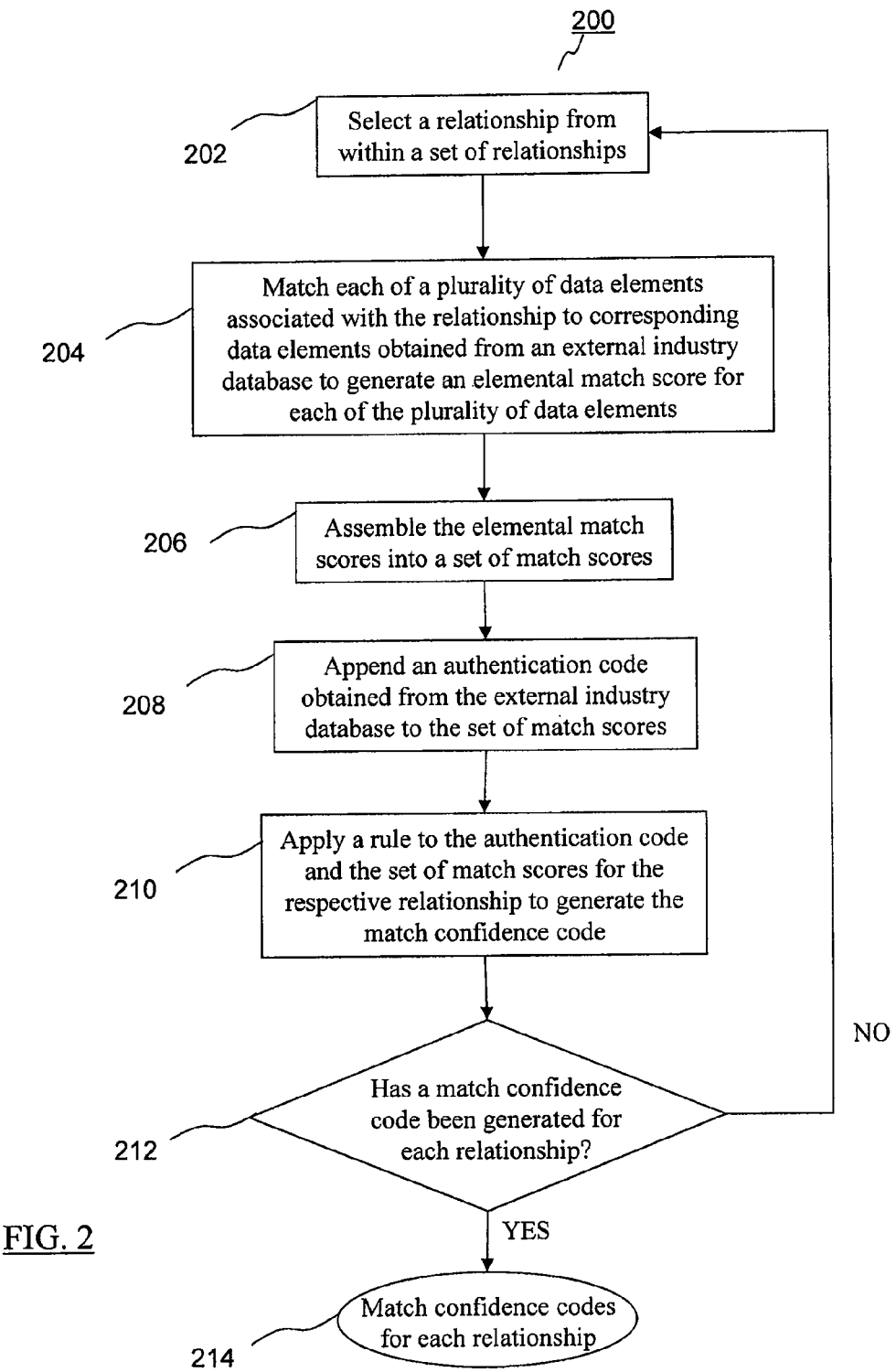
FIG. 2 illustrates a method for generating match confidence codes that may be incorporated into the exemplary method of FIG. 1.

FIG. 2 illustrates a method 200 for generating match confidence codes that may be incorporated into step 106 of exemplary method 100 of FIG. 1. In step 202, a relationship is selected from a set of relationships linked to the customer. Subsequently, in step 204, each of a plurality of customer data elements associated with the selected relationship is matched to a corresponding plurality of customer data elements obtained from an external industry database to generate an elemental match score for each data element associated with the relationship. In one embodiment, step 204 may compare a name, an address, a date of birth, and a social security number associated with the selected relationship to corresponding customer data obtained from the external data provider.

The elemental match score assigned in step 204 may quantify the closeness of a match between the respective data elements. For example, if a name associated with the selected relationship is an exact match to that obtained from the data provider, an elemental score of five (5) may be assigned to the name element. If, however, a complete mismatch exists between the name associated with the relationship and that obtained from the data provider, then the name element may be assigned an elemental match score of one (1). Elemental match scores between one (1) and five (5) may be assigned based on a quality of the match between data associated with the relationship and either a current or a historical value of corresponding data obtained from the data provider. Although described in terms of the name data element, the process outlined above may be employed to assign elemental match scores to each data element associated with the relationship.

The individual elemental match scores for the selected relationship are assembled in step 206 into a set of match scores for the selected relationship, and an authentication code obtained from the external industry database is appended to set of match scores in step 208 to form a match pattern for the selected relationship. For example, if elemental match scores are generated for a name, address, date of birth, and social security number associated with the relationship, then the corresponding set of match scores would contain four elements and the match pattern would contain five data elements (e.g., the set of match scores and the authentication code).

In step 210, a rule is applied to the set of match scores for the respective relationship and the authentication code to generate a match confidence code for the respective relationship. As described above, the match confidence code is a metric that describes the quality of the data associated with the relationship. In one embodiment, the match confidence code for the respective relationship may be selected from one of a plurality of confidence levels based on the authentication code and on the quality of customer data associated with the relationship. For example, match confidence codes of LOW, MAYBE, WEAK YES, STRONG YES, and EXACT may be generated for the selected relationship. Additionally, in step 210, a boosting algorithm may be applied to the set of match scores for the respective relationship to generate a composite score, and one of the plurality of confidence levels may be selected for the respective relationship based on the composite score. Further, in an additional embodiment, a higher confidence level may be generated for a relationship linked to an authenticated customer than would be generated for a comparable relationship linked to an unauthenticated customer. One skilled in the art would recognize that any number of additional confidence levels, including numerical values, might be assigned without departing from the spirit and scope of the present invention.

Step 212 then processes the set of relationships to determine whether a match confidence code has been generated for each relationship in the set of relationships. If each relationship within the set of relationships has been assigned a match confidence code, then step 214 passes the set of match confidence codes for the set of relationships back to the exemplary method 100 of FIG. 1 for additional processing. If, however, step 212 identifies that relationships in the set of relationships lack match confidence codes, then the method passes back to step 202, and an additional relationship is selected for processing.

Figure 3:
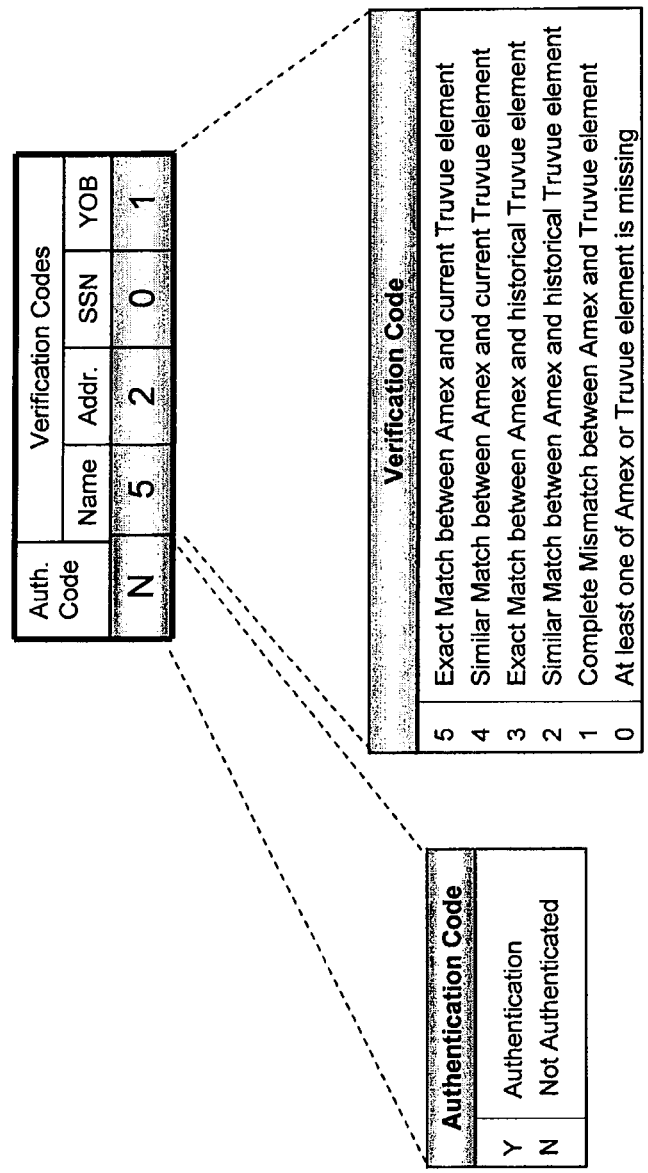
FIGS. 3 and 4 are examples that illustrate the method of FIG. 2.

FIG. 3 is an example that illustrates the method of FIG. 2. In FIG. 3, elemental match scores for a name, an address ("Addr."), a social security number ("SSN"), and a date of birth ("YOB") associated with a relationship have been assembled into a set of match scores for the relationship. Further, an authentication code ("Auth. Code") has been obtained from the external industry database, and the authentication code has been appended to the set of match scores to form a match pattern for the relationship.

As described above, a match pattern includes five elements of information that describe the quality of the match between data associated with the relationship and customer data obtained from the external industry database. In the example of FIG. 3, each individual elemental score (e.g., that for name, address, social security number, and date of birth) ranges from zero (0) to five (5), depending upon the quality of the match between the relationship data and the corresponding customer data obtained from the external industry database.

In one embodiment, a match between relationship data and current customer data obtained from the external industry database is assigned a higher elemental match score than a corresponding match between relationship data and historical customer data obtained from the external industry database. For example, an elemental match score of five (5) for a data element indicates that the data element associated with the relationship exactly matches a current value of the data element obtained from the external industry database. In contrast, an exact match between the data element associated with the relationship and a corresponding, historical element of customer data obtained from the external industry database would result an elemental match score of three (3). Similarly, for example, an elemental match score of (4) indicates that the relationship data element is similar to a current value of the customer data element obtained from the external industry database, while an elemental match score of one (1) indicates that the relationship data element is similar to a historical value of the corresponding customer data element obtained from the external industry database. A score of zero (0) would be assigned only in those cases where the data element is missing from the relationship data and/or the customer data obtained from the external industry database.

In the example of FIG. 3, the generated match pattern for the relationship has a value of "N5201," thus indicating that the customer associated with the relationship has not been authenticated. Further, the match pattern indicates that the name associated with the relationship is an exact match with the current customer name obtained from the external industry database. The match pattern also indicates that the address associated with the relationship is similar to a previous (or historical) address obtained from the external industry database, and the date of birth associated with the relationship and the date of birth obtained from the external industry database are complete mismatches. In addition, the match pattern indicates that the social security number is missing from either the customer data associated with the relationship or the customer data obtained from the external industry database.

Figure 4:
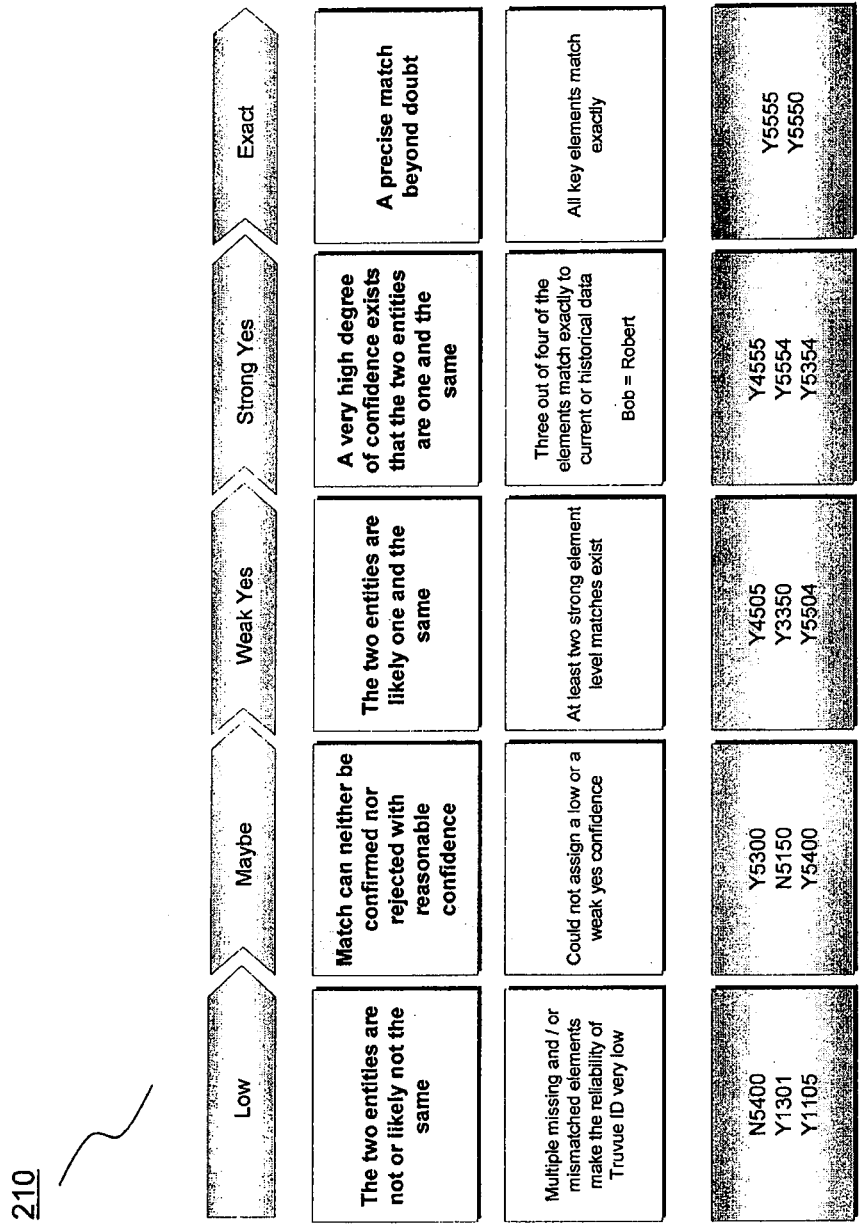

In example of FIG. 3, the elemental match scores have been described in terms of a particular range of scores based on relationship data, current customer data, and historical customer data. One skilled in the art would recognize that elemental match scores based on a variety of different parameters and characterized by a variety of ranges may be assigned to data elements without departing from the spirit and scope of the present invention. Further, one skilled on the art would also recognize that the match pattern described in FIG. 3 could be constructed from any number of elemental match scores without departing from the spirit and scope of the present invention FIG. 4 is second example that illustrates the method of FIG. 2. FIG. 4 illustrates the application of a rule to generate a match confidence code for a relationship based on a set of match scores for the relationship and an authentication code (e.g., the match pattern for the relationship). For example, a relationship may be assigned a match confidence code of LOW if the match pattern for that relationship includes any combination of missing and mismatched data elements. In such a case, there is little probability that the data associated with the account is correct. Examples of match patterns that would be assigned a LOW confidence level include, but are not limited to, N5400, Y1301, and Y1105.

Further, a relationship may be assigned a confidence level of WEAK YES if the match pattern for that relationship includes two or more strong data element matches and if the customer associated with the relationship has been authenticated. In such a case, the relationship is likely to be linked correctly to the customer. Examples of match patterns that would be assigned a WEAK YES confidence level include Y4505, Y3350, and Y5504.

However, a match pattern associated with a relationship may not provide a clear indication of the quality of the match. For example, the match pattern may include strong matches between data associated with the relationship and obtained from an external industry database, while indicating that the customer cannot be authenticated. Alternatively, the match pattern may indicate one a single, strong element level match for a relationship linked to an authenticated customer. In such instances, the relationship may be assigned a confidence level of MAYBE, thus implying that a match can neither be confirmed nor rejected with any degree of confidence. Examples of match patterns that would be assigned a MAYBE confidence level include Y5300, N5150, and Y5400.

A relationship may be assigned a match confidence code of STRONG YES if the match pattern for the relationship indicates three out of four data elements are strong matches with data associated with an authenticated customer. In such an instance, there is a very strong likelihood that the relationship data matches data matches that obtained from the external industry database, and further, that the relationship is correctly linked to the customer. Examples of match patterns that would be assigned a STRONG YES confidence level include Y4555, Y5354, and Y5554.

Figure 5:
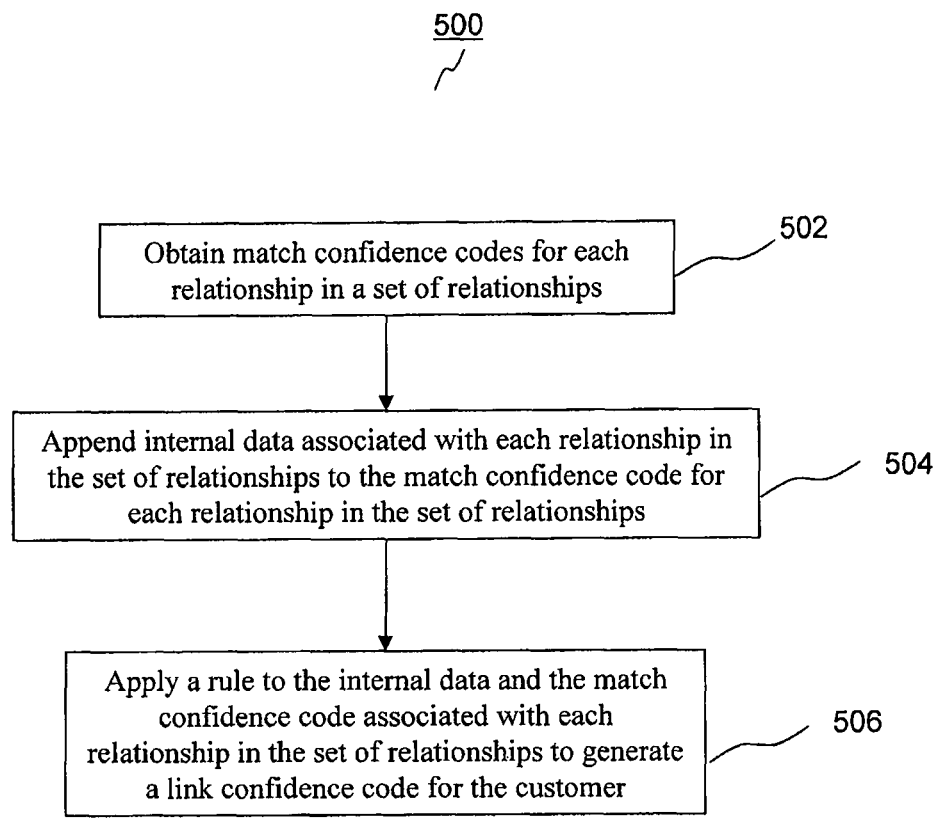
FIG. 5 illustrates a method for generating link confidence codes that may be incorporated into the exemplary method of FIG. 1.

If a match pattern for a relationship indicates that all key relationship data elements match corresponding data elements obtained for the customer, then the relationship is assigned a confidence level of EXACT. In the example of FIG. 5, the key data elements include the name, address, and social security number of the customer. As such, there is no doubt that the relationship is correctly linked to the authenticated customer. Examples of match patterns that would be assigned an EXACT confidence level include Y5555 and Y5550.

In the example of FIG. 4, match patterns are characterized by five confidence levels based on the quality of the data associated with relationship and the authentication of the customer. One skilled in the art would recognize that the various confidence levels might be assigned according to a variety of parameters without departing from the spirit and scope of the present invention.

FIG. 5 illustrates a method 500 for generating link confidence codes that may be incorporated into step 108 of exemplary method 100 of FIG. 1. As described above with reference to FIG. 1, the link confidence code is generated at the customer level, and the link confidence code indicates the quality of linking between customers and relationships in a database.

In step 502, match confidence codes are obtained for each relationship in a set of relationships linked to a customer. Additionally, in step 504, internal information associated with each relationship in the set of relationships is appended to the corresponding match confidence code for each relationship in the set of relationships.

In one embodiment, the internal information may include an age of the customer information associated with the relationship, including, but not limited to, the time period since the customer information was updated (e.g., thirty days, one hundred days, one year, etc.). In additional embodiments, the internal information may indicate an age of customer information entered onto a customer service website associated with the relationship (e.g., a customer service website for a financial transaction instrument). One skilled in the art would recognize that additional sources and varieties of internal information may be used to generate the link confidence score for the customer without departing from the spirit and scope of the present invention.

In step 506, a rule is applied to the internal information and match confidence code associated with each relationship in the set of relationships to generate the link confidence code for the customer. Further, in step 506, the applied rule generates a numerical linking score indicative of the quality of customer linking, and the confidence level is selected on the basis of this score. For example, in one embodiment, a weighted average may be applied to the set of match scores and the internal information associated with each relationship in the set of relationships to generate the linking score. In one embodiment, the link confidence code may be selected from a plurality of confidence levels based on the internal data and match confidence code associated with each relationship in the set of relationships.

The plurality of confidence levels may include, but are not limited to, confidence levels of LOW, MAYBE, WEAK YES, STRONG YES, and EXACT. Further, in an additional embodiment, the internal information associated with the customer may be weighted such that a higher confidence level may be selected for a relationship having more frequently updated customer information than would be selected for a relationship having less frequently updated customer information. One skilled in the art would recognize that additional confidence levels, including numerical values, might be assigned to relationships without departing from the spirit and scope of the present invention. Once assigned in step 506, the link confidence code for the customer is passed back to the exemplary method of FIG. 1 for additional processing.

IV. Exemplary Computer Systems

Figure 6:
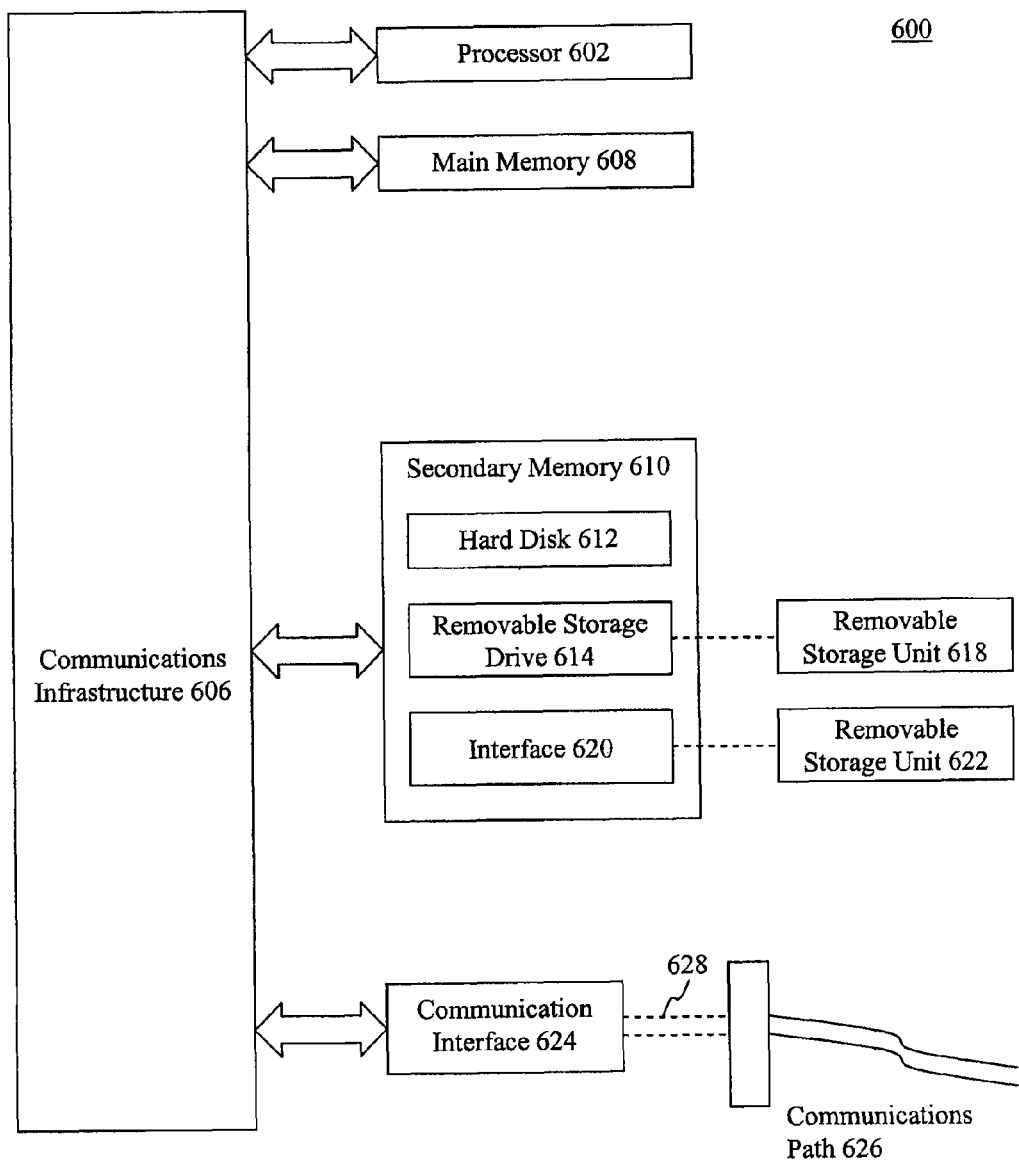
FIG. 6 is a diagram of an exemplary computer system upon which the present invention may be implemented.

FIG. 6 is a diagram of an exemplary computer system 600 upon which the present invention may be implemented. The exemplary computer system 600 includes one or more processors, such as processor 602. The processor 602 is connected to a communication infrastructure 606, such as a bus or network. Various software implementations are described in terms of this exemplary computer system. After reading this description, it will become apparent to a person skilled in the relevant art how to implement the invention using other computer systems and/or computer architectures.

Computer system 600 also includes a main memory 608, preferably random access memory (RAM), and may include a secondary memory 610. The secondary memory 610 may include, for example, a hard disk drive 612 and/or a removable storage drive 614, representing a magnetic tape drive, an optical disk drive, etc. The removable storage drive 614 reads from and/or writes to a removable storage unit 618 in a well-known manner. Removable storage unit 618 represents a magnetic tape, optical disk, or other storage medium that is read by and written to by removable storage drive 614. As will be appreciated, the removable storage unit 618 can include a computer usable storage medium having stored therein computer software and/or data.

In alternative implementations, secondary memory 610 may include other means for allowing computer programs or other instructions to be loaded into computer system 600. Such means may include, for example, a removable storage unit 622 and an interface 620. An example of such means may include a removable memory chip (such as an EPROM, or PROM) and associated socket, or other removable storage units 622 and interfaces 620, which allow software and data to be transferred from the removable storage unit 622 to computer system 600.

Computer system 600 may also include one or more communications interfaces, such as communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628, which may be electronic, electromagnetic, optical or other signals capable of being received by communications interface 624. These signals 628 are provided to communications interface 624 via a communications path (i.e., channel) 626. This channel 626 carries signals 628 and may be implemented using wire or cable, fiber optics, an RF link and other communications channels. In an embodiment of the invention, signals 628 include data packets sent to processor 602. Information representing processed packets can also be sent in the form of signals 628 from processor 602 through communications path 626.

The terms "computer program medium" and "computer usable medium" are used to refer generally to media such as removable storage units 618 and 622, a hard disk installed in hard disk drive 612, and signals 628, which provide software to the computer system 600.

Computer programs are stored in main memory 608 and/or secondary memory 610. Computer programs may also be received via communications interface 624. Such computer programs, when executed, enable the computer system 600 to implement the present invention as discussed herein. In particular, the computer programs, when executed, enable the processor 602 to implement the present invention. Where the invention is implemented using software, the software may be stored in a computer program product and loaded into computer system 600 using removable storage drive 618, hard drive 612 or communications interface 624.

V. Conclusion

The disclosed processes provide an accessible, actionable, and easily-executed platform for generating data quality indicators for relationships in a database. Through the disclosed processes, businesses, such as financial service companies, obtain valuable insight on customer linkages based on industry information, thus enabling businesses to improve customer linkages and to make better decisions on risk, servicing, and marketing at the customer level. Further, merchants benefit from a reduction in (POS) disruptions due to linking errors, thus increasing the potential sales volume of merchants and increasing customer satisfaction. Customers also benefit from more accurate and timely decisions on risk, marketing, and customer service.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   determining, by a computer based system for generating data quality indicators for relationships, a link confidence code for a customer, wherein the link confidence code comprises an indication of a quality of a linking between the customer and a set of relationships based on a match confidence code for each relationship in the set of relationships and internal information associated with each relationship in the set of relationships; and
   providing, by the computer based system, at least one of the link confidence code for the customer and the match confidence code for each relationship in the set of relationships linked to the customer.

2. The method of claim 1, further comprising verifying, by the computer based system, quality of relationships in the database using at least one of the link confidence code for the customer and the match confidence code for each relationship.

3. The method of claim 1, further comprising generating, by the computer based system, a match confidence code for each relationship in the set of relationships based on data associated with the respective relationship and corresponding data obtained from an industry database.

4. The method of claim 1, wherein the generating comprises:
    matching, by the computer based system, each of a plurality of data elements associated with the respective relationship to corresponding data elements obtained from the industry database to generate an elemental match score for each of the plurality of data elements;
    assembling, by the computer based system, the elemental match scores for the respective relationship into a set of match scores for the respective relationship;
    appending, by the computer based system, an authentication code obtained from the industry database to the set of match scores for the respective; and
    applying a rule, by the computer based system, to generate the match confidence code for the respective relationship based on the set of match scores for the respective relationship and the authentication code.

5. The method of claim 4, wherein the matching comprises matching, by the computer based system, at least one of a name, an address, a social security number, and a date of birth associated with the respective relationship to corresponding data elements obtained from the industry database.

6. The method of claim 4, wherein the applying comprises selecting, by the computer based system, the match confidence code for the respective relationship from a plurality of confidence levels based on the match pattern and the authentication code of the respective relationship.

7. The method of claim 1, wherein the determining comprises:
    appending, by the computer based system, the internal data associated with each relationship in the set of relationships to the match confidence code for each relationship in the set of relationships; and
    applying a rule, by the computer based system, to the internal data and match confidence code associated with each relationship the set of relationships to generate the link confidence code for the customer.

8. The method of claim 7, wherein the applying comprises selecting, by the computer based system, the link confidence code for the customer from a plurality of confidence levels based on the internal data and match confidence code associated with each relationship in the set of relationships.

9. The method of claim 7, wherein the appending comprises adding, by the computer based system, an age of the data associated with the relationship to the match confidence code for each relationship in the set of relationships.

10. The method of claim 1, wherein the set of relationships includes multiple relationships obtained from a database.

11. The method of claim 1, wherein relationships are established between a customer and a business, in a database.

12. The method of claim 1, wherein the link confidence code is distinct from the match confidence code.

13. A system comprising:
    a processor configured for generating data quality indicators for relationships,
    a tangible, non-transitory memory configured to communicate with the processor,
    the tangible, non-transitory memory having instructions stored thereon that, in response to execution by the processor, cause the processor to perform operations comprising:
        determining, by the processor, a link confidence code for a customer, wherein the link confidence code comprises an indication of a quality of a linking between the customer and a set of relationships based on a match confidence code for each relationship in the set of relationships and internal information associated with each relationship in the set of relationships; and
        providing, by the processor, at least one of the link confidence code for the customer and the match confidence code for each relationship in the set of relationships linked to the customer.

14. The system of claim 13, further comprising verifying, by the processor, quality of relationships in the database using at least one of the link confidence code for the customer and the match confidence code for each relationship.

15. The system of claim 13, further comprising generating, by the processor, a match confidence code for each relationship in the set of relationships based on data associated with the respective relationship and corresponding data obtained from an industry database.

16. The system of claim 13, wherein the generating comprises:
    matching, by the processor, each of a plurality of data elements associated with the respective relationship to corresponding data elements obtained from the industry database to generate an elemental match score for each of the plurality of data elements;
    assembling, by the processor, the elemental match scores for the respective relationship into a set of match scores for the respective relationship;
    appending, by the processor, an authentication code obtained from the industry database to the set of match scores for the respective; and
    applying a rule, by the processor, to generate the match confidence code for the respective relationship based on the set of match scores for the respective relationship and the authentication code.

17. The system of claim 16, wherein the matching comprises matching, by the processor, at least one of a name, an address, a social security number, and a date of birth associated with the respective relationship to corresponding data elements obtained from the industry database.

18. The system of claim 16, wherein the applying comprises selecting, by the processor, the match confidence code for the respective relationship from a plurality of confidence levels based on the match pattern and the authentication code of the respective relationship.

19. The system of claim 13, wherein the determining comprises:
    appending, by the processor, the internal data associated with each relationship in the set of relationships to the match confidence code for each relationship in the set of relationships; and
    applying a rule, by the processor, to the internal data and match confidence code associated with each relationship the set of relationships to generate the link confidence code for the customer.

20. An article of manufacture including a non-transitory, tangible computer readable medium having instructions stored thereon that, in response to execution by a computer-based system for generating data quality indicators for relationships, cause the computer-based system to perform operations comprising:
    determining, by the computer based system, a link confidence code for a customer, wherein the link confidence code comprises an indication of a quality of a linking between the customer and a set of relationships based on a match confidence code for each relationship in the set of relationships and internal information associated with each relationship in the set of relationships; and
    providing, by the computer based system, at least one of the link confidence code for the customer and the match confidence code for each relationship in the set of relationships linked to the customer.

\* \* \* \* \*